US012039903B2

(12) United States Patent
Long et al.

(10) Patent No.: US 12,039,903 B2
(45) Date of Patent: Jul. 16, 2024

(54) DISPLAY SUBSTRATE, DISPLAY PANEL AND MANUFACTURING METHOD THEREOF

(71) Applicants: Chengdu BOE Optoelectronics Technology Co., Ltd., Sichuan (CN); BOE TECHNOLOGY GROUP CO., LTD., Beijing (CN)

(72) Inventors: Yue Long, Beijing (CN); Jianchang Cai, Beijing (CN); Feng Wei, Beijing (CN); Chao Wu, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/771,929

(22) PCT Filed: May 12, 2021

(86) PCT No.: PCT/CN2021/093332
§ 371 (c)(1),
(2) Date: Apr. 26, 2022

(87) PCT Pub. No.: WO2021/254040
PCT Pub. Date: Dec. 23, 2021

(65) Prior Publication Data

US 2022/0383784 A1 Dec. 1, 2022

(30) Foreign Application Priority Data

Jun. 18, 2020 (CN) ......................... 202010561223.0

(51) Int. Cl.
*G09G 3/00* (2006.01)

(52) U.S. Cl.
CPC .................................... *G09G 3/006* (2013.01)

(58) Field of Classification Search
CPC ............ G09G 3/006; G09G 2300/0426; H01L 22/32; H01L 21/304
See application file for complete search history.

(56) References Cited

U.S. PATENT DOCUMENTS 5,654,582 A * 8/1997 Kijima .................... H01L 22/34 257/210
5,897,193 A * 4/1999 Nishino ............. G01R 31/2856 257/E23.079

(Continued)

FOREIGN PATENT DOCUMENTS

CN 1693949 A 11/2005
CN 101251565 A 8/2008

(Continued)

OTHER PUBLICATIONS

China Patent Office, CN202010561223.0 First Office Action issued on Aug. 13, 2021.

(Continued)

*Primary Examiner* — Akm Zakaria
(74) *Attorney, Agent, or Firm* — HOUTTEMAN LAW LLC

(57) ABSTRACT

The embodiments of the present disclosure provide a display substrate, a display panel and a manufacturing method thereof. The display substrate includes a body portion and a to-be-cut portion arranged on at least one side of the body portion, and the body portion and the to-be-cut portion are in a same plane and connected to have a one-piece structure; the display substrate further includes a plurality of test electrodes, some test electrodes are arranged on the body portion, and the other test electrodes are arranged on the to-be-cut portion. The display panel includes the body portion in the display substrate.

10 Claims, 7 Drawing Sheets

(56) References Cited

U.S. PATENT DOCUMENTS

| | | | | |
|---|---|---|---|---|
| 9,293,425 | B2 | 3/2016 | Lee et al. | |
| 9,356,087 | B1* | 5/2016 | Lee | H01L 27/1218 |
| 2005/0243267 | A1* | 11/2005 | Jeoung | G02F 1/1309 349/187 |
| 2009/0213288 | A1 | 8/2009 | Chen et al. | |
| 2009/0294771 | A1 | 12/2009 | Kim et al. | |
| 2011/0049688 | A1* | 3/2011 | Sasaki | H01L 23/4985 257/668 |
| 2011/0096449 | A1 | 4/2011 | Lee et al. | |
| 2015/0243242 | A1* | 8/2015 | Eom | G09G 5/00 345/211 |
| 2022/0172653 | A1* | 6/2022 | Kim | G09G 3/006 |

FOREIGN PATENT DOCUMENTS

| | | | |
|---|---|---|---|
| CN | 101562185 | A | 10/2009 |
| CN | 102736336 | A | 10/2012 |
| CN | 107300793 | A | 10/2017 |
| CN | 107658234 | A | 2/2018 |
| CN | 108490654 | A | 9/2018 |
| CN | 108919535 | A | 11/2018 |
| CN | 109449140 | A | 3/2019 |
| CN | 109521584 | A | 3/2019 |
| CN | 109659277 | A | 4/2019 |
| CN | 111007686 | A | 4/2020 |
| CN | 111129090 | A | 5/2020 |
| CN | 111190312 | A | 5/2020 |
| CN | 111653548 | A | 9/2020 |
| JP | H10268273 | A | 10/1998 |
| JP | 2009036938 | A | 2/2009 |
| KR | 20060114864 | A | 11/2006 |

OTHER PUBLICATIONS

China Patent Office, CN202010561223.0 Second Office Action issued on Mar. 24, 2022.

China Patent Office, CN202010561223.0 Decision of Rejection issued on Aug. 3, 2022.

* cited by examiner

DISPLAY SUBSTRATE, DISPLAY PANEL AND MANUFACTURING METHOD THEREOF

CROSS-REFERENCE TO RELATED APPLICATION

This is a National Phase Application filed under 35 U.S.C. 371 as a national stage of PCT/CN2021/093332, filed on May 12, 2021, the contents of which are incorporated herein in their entirety by reference.

TECHNICAL FIELD

The present disclosure relates to the field of display technology, in particular to a display substrate, a display panel and a manufacturing method thereof.

BACKGROUND

In order to avoid the introduction of a defective substrate into the assembly process and save assembly materials, a substrate is required to be tested after the manufacturing process for the substrate is completed. In general, the substrate is tested by providing, on the substrate, test electrodes which are connected to signal lines in the substrate. During testing, a signal generator provides signals to the test electrodes by press fitting a pin or a peripheral circuit board, so that the purpose of testing is achieved.

SUMMARY

The embodiments of the present disclosure provide a display substrate, a display panel and a manufacturing method thereof.

In a first aspect, an embodiment of the present disclosure provides a display substrate, including a body portion and a to-be-cut portion on at least one side of the body portion, and the body portion and the to-be-cut portion are in a same plane and connected to have a one-piece structure; and the display substrate further includes a plurality of test electrodes, some of the plurality of test electrodes are arranged on the body portion, and the others of the plurality of test electrodes are arranged on the to-be-cut portion.

Optionally, the to-be-cut portion is on one side of the body portion.

Optionally, the to-be-cut portion includes two portions on two opposite sides of the body portion.

Optionally, the plurality of test electrodes are distributed on edges of the body portion and the to-be-cut portion at a same side of the display substrate, and the plurality of test electrodes are arranged in a straight line.

Optionally, the body portion includes a display region and a frame region around the display region; and the body portion includes a bonding end in the frame region, and the bonding end and the plurality of test electrodes are on an edge of the body portion at a same side of the display substrate.

Optionally, the plurality of test electrodes are distributed at one side of the bonding end along a direction in which the body portion and the to-be-cut portion are arranged.

Optionally, the plurality of test electrodes are distributed at two opposite sides of the bonding end along a direction in which the body portion and the to-be-cut portion are arranged.

Optionally, the plurality of test electrodes and the bonding end are arranged in a straight line, an extension direction of which is along the direction in which the body portion and the to-be-cut portion are arranged.

Optionally, the test electrodes on the body portion are distributed on an edge of the body portion at a same side of the display substrate and arranged in a straight line; the test electrodes on the to-be-cut portion are distributed on an edge of the to-be-cut portion at a same side of the display substrate and arranged in a straight line; and the plurality of test electrodes are on edges of the body portion and the to-be-cut portion at different sides of the display substrate.

Optionally, the body portion includes a plurality of first sub-layers stacked in sequence, and the test electrodes on the body portion are distributed on a surface layer of the body portion; or, the test electrodes on the body portion are distributed on one of the plurality of first sub-layers inside the body portion, and are exposed through first vias in at least one first sub-layer covering on the test electrodes; and the to-be-cut portion includes a plurality of second sub-layers stacked in sequence, and the test electrodes on the to-be-cut portion are distributed on a surface layer of the to-be-cut portion; or, the test electrodes on the to-be-cut portion are distributed on one of the plurality of second sub-layers inside the to-be-cut portion, and are exposed through second vias in at least one second sub-layer covering on the test electrodes.

In a second aspect, an embodiment of the present disclosure further provides a display panel, which includes the body portion in the above display substrate.

In a third aspect, an embodiment of the present disclosure further provides a method for manufacturing a display panel, including: manufacturing the above display substrate; cutting the display substrate along a border line between the body portion and the to-be-cut portion, to cut off the to-be-cut portion; and performing an assembly process on the display substrate with the to-be-cut portion cut off.

BRIEF DESCRIPTION OF DRAWINGS

The accompanying drawings, which are provided for a further understanding of the present disclosure and constitute a part of this specification, are for explaining the present disclosure together with the embodiments of the present disclosure, but are not intended to limit the present disclosure. The above and other features and advantages will become more apparent to one of ordinary skill in the art by describing in detail exemplary embodiments thereof with reference to the accompanying drawings. In the drawings.

REFERENCE NUMERALS

Figure 1:
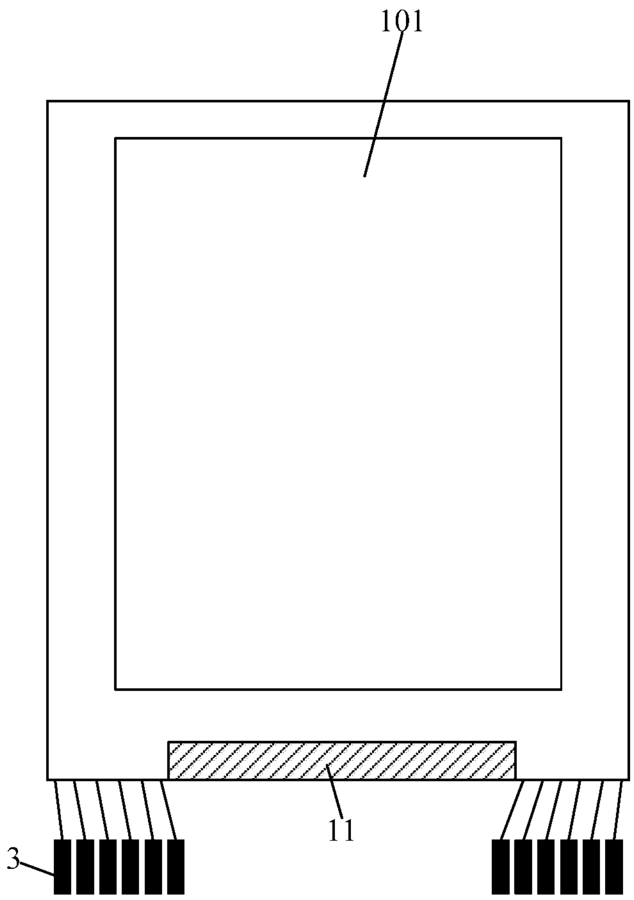
FIG. 1 is a top view of an arrangement of test electrodes in the related art.

1. body portion; 101. display region; 102. frame region; 11. bonding end; 12. first sub-layer; 2. to-be-cut portion; 21. second sub-layer; 3. test electrode; 4. first via; 5. second via; L. direction along which the body portion and the to-be-cut portion are arranged.

DETAIL DESCRIPTION OF EMBODIMENTS

In order to enable one of ordinary skill in the art to better understand the technical solutions of the embodiments of the present disclosure, a display substrate, a display panel and a manufacturing method thereof according to the embodiments of the present disclosure will be described in further detail with reference to the accompanying drawings and the specific implementations.

The embodiments of the present disclosure will be described more fully hereinafter with reference to the accompanying drawings, but the embodiments shown may be embodied in different forms and should not be construed as being limited to the embodiments set forth herein. Rather, these embodiments are provided so that this disclosure will be thorough and complete, and will fully convey the scope of the present disclosure to one of ordinary skill in the art.

The embodiments of the present disclosure are not limited to the embodiments shown in the drawings, but include modifications of configurations formed based on a manufacturing process. Thus, regions illustrated in the drawings are schematic, and shapes of the regions shown in the drawings illustrate specific shapes of the regions, but are not intended to be limiting.

FIG. 1 shows a common arrangement of test electrodes 3, in which all test electrodes 3 are arranged at one edge of a display substrate where a bonding end 11 is usually arranged, and the test electrodes 3 are arranged on a side of the bonding end 11 away from the display region 101, i.e. the test electrodes 3 are all arranged in a substrate region outside the display substrate. This arrangement needs to occupy an additional space outside one edge of the display substrate. For a product with a medium or large size, more space is left due to the large size of the product when the display substrates are arranged on a mother board, and therefore enough space may be provided for arranging the test electrodes 3. However, for a product with a small size, the display substrates are arranged very densely on the mother board, and a distance between any two adjacent display substrates is very small. If space between the display substrates is left for arranging the test electrodes 3, the number of the display substrates arranged on the mother board and the product cost are adversely affected.

Figure 2:
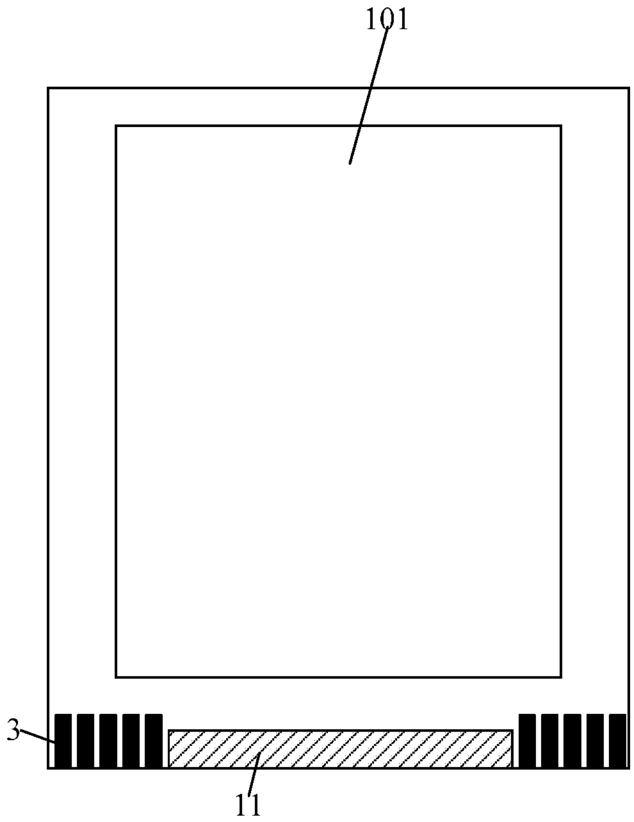
FIG. 2 is a top view of another arrangement of test electrodes in the related art.

FIG. 2 shows another common arrangement of test electrodes 3, in which the test electrodes 3 are provided on both the left and right of the bonding end 11 at an edge of the display substrate, i.e., the test electrodes 3 are provided on the display substrate. This arrangement is also less problematic for a product with the medium or large size, because the product with the medium or large size has large space on both the left and right for arranging the test electrodes 3. For a product with the small size, however, the size results in small space on both the left and right. After the bonding end 11 is provided, its left and right sides almost reach the edge of the display substrate, and there is no space for arranging the test electrodes 3. In this case, if the test electrodes 3 must be arranged, sizes of the display substrate on the left and right are also increased, which adversely affects the efficiency for cutting the display substrates. The cutting efficiency for the display substrates is the number of the display substrates which can be obtained by cutting on one mother board.

In summary, the current arrangement of the test electrodes is less problematic for a display substrate with the medium or large size, but will affect the cutting efficiency for a product with the small size because the space for arranging the test electrodes becomes a bottleneck due to the limitation of the small size of the product.

In view of the above problem that the cutting efficiency for the display substrates is easily affected due to the limited space for arranging the test electrodes for products with the medium and small, the embodiments of the present disclosure provide a display substrate, a display panel and a manufacturing method thereof.

Figure 3:
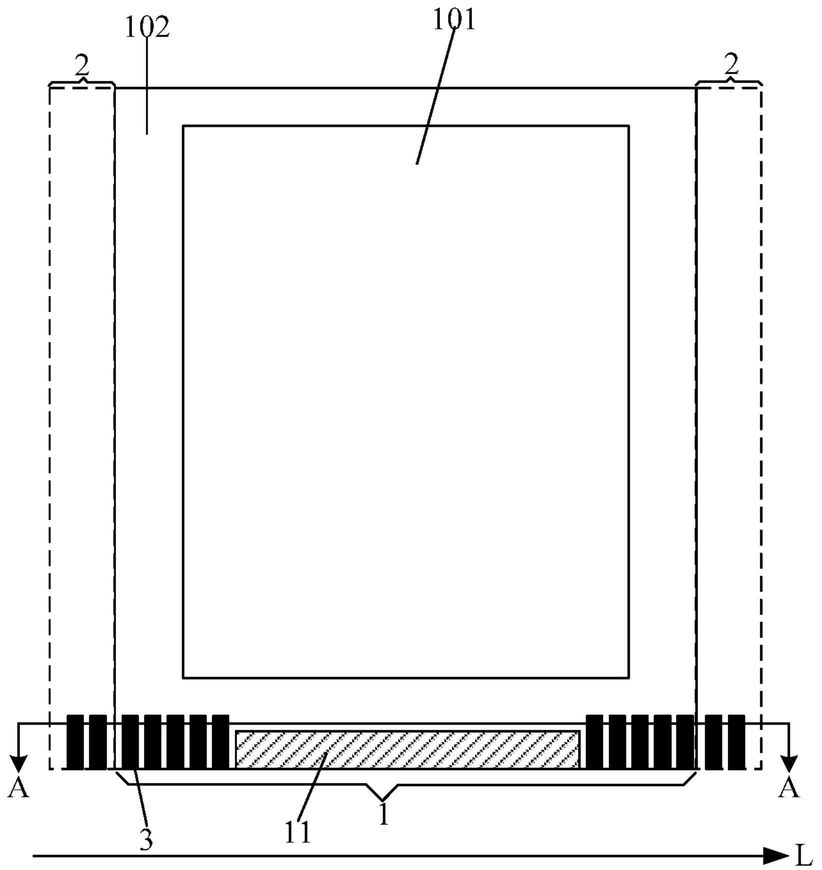
FIG. 3 is a top view of a structure of a display substrate according to an embodiment of the present disclosure.

The embodiments of the present disclosure provide a display substrate, as shown in FIG. 3, including a body portion 1, a to-be-cut portion 2 disposed on at least one side of the body portion 1. The body portion 1 and the to-be-cut portion 2 are in a same plane and connected to have a one-piece structure. The display substrate further includes a plurality of test electrodes 3, some of the plurality of test electrodes 3 are arranged on the body portion 1, and the others of the plurality of test electrodes 3 are arranged on the to-be-cut portion 2.

The body portion 1 refers to a portion of the display substrate which needs to be reserved when the display panel is formed subsequently. The to-be-cut portion 2 refers to a portion of the display substrate which needs to be cut off when the display panel is formed subsequently. That is, a border line between the body portion 1 and the to-be-cut portion 2 is a cutting line of the display substrate for subsequently forming the display panel. The test electrodes 3 are connected to circuits inside the display substrate and configured to introduce test signals to the circuits inside the display substrate, so as to test whether the circuits can operate normally.

In the display substrate, some test electrodes 3 are arranged on the body portion 1, and the other test electrodes 3 are arranged on the to-be-cut portion 2. Compared with the case in the related art that the test electrodes 3 are arranged in the substrate region outside the display substrate or on the display substrate, in the embodiment, some test electrodes 3 are arranged on the portion of the display substrate which needs to be reserved when the display panel is formed subsequently, and the other test electrodes 3 are arranged on the portion of the display substrate which needs to be cut off when the display panel is formed subsequently, which can optimize the arrangement and layout of the test electrodes 3, reduce the requirement of the test electrodes 3 on the arrangement space, and ensure that one mother board can be cut into a large number or a maximum number of display substrates, thereby alleviating or eliminating the adverse effect of the arrangement of the test electrodes 3 on the cutting efficiency for the display substrates. In addition, the test electrodes 3 are no longer useful after testing the circuits in the display substrate, so some test electrodes 3 are to be cut off as the to-be-cut portion 2 is subsequently cut off, which will not affect the normal display of the display substrate.

Optionally, the to-be-cut portions 2 are provided on two opposite sides of the body portion 1.

Optionally, the test electrodes 3 are distributed and arranged in a straight line on edges of the body portion 1 and the to-be-cut portion 2 at a same side. The test electrodes 3 are generally the same in size and shape. In this way, on one hand, the test electrodes 3 do not occupy too much space on the display substrate, and the manufacturing process for the test electrodes 3 can be simplified; on the other hand, the test electrodes 3 are arranged in a straight line, which can facilitate inputting test signals to the circuits in the display substrate, thus improving the test efficiency.

Optionally, the body portion 1 includes a display region 101 and a frame region 102 disposed around the display region 101; the body portion 1 includes a bonding end 11 disposed in the frame region 102 and located on a same side of the body portion 1 as the test electrodes 3. With the arrangement, the bonding end 11 and the test electrodes 3 may be formed by one manufacturing process. For example, one mask is used for simultaneously forming patterns of the bonding end 11 and the test electrodes 3 through one mask process, so that the manufacturing process for the display substrate is simplified, and the manufacturing cost for the display substrate is reduced.

Figure 4:
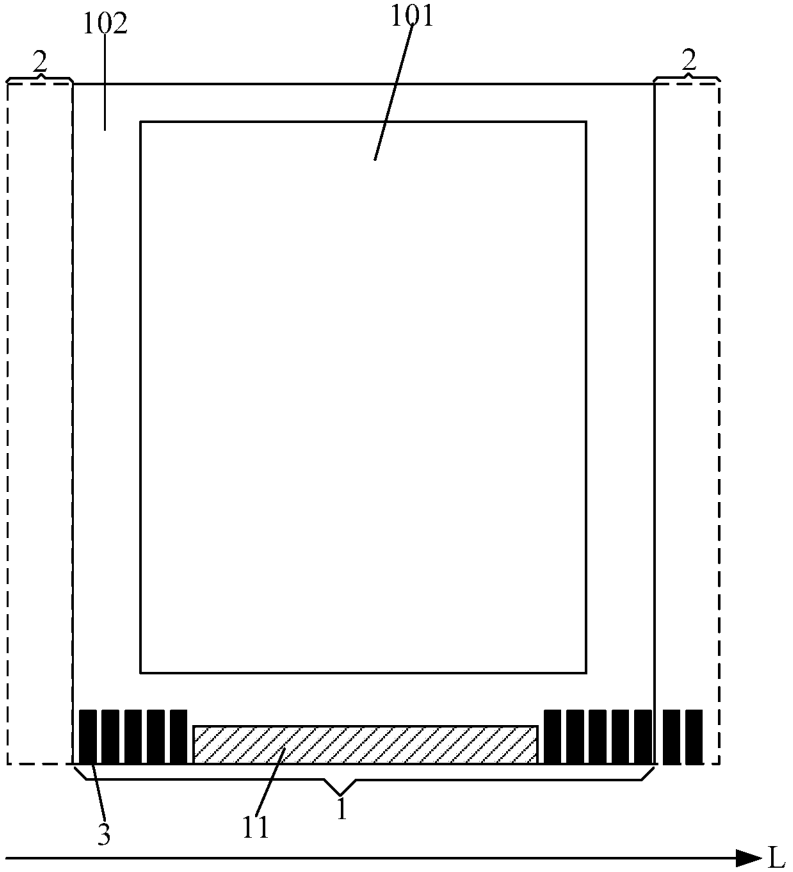
FIG. 4 is a top view of another structure of a display substrate according to an embodiment of the present disclosure.

Optionally, the test electrodes 3 are distributed at two opposite sides of the bonding end 11 along a direction L in which the body portion 1 and the to-be-cut portion 2 are arranged. For the display substrate with a large number of test electrodes 3, the test electrodes 3 may be arranged at two opposite sides of the bonding end 11 as shown in FIG. 3. For the display substrate with a small number of test electrodes 3, the test electrodes 3 may be arranged at two opposite sides of the bonding end 11 as shown in FIG. 4.

Figure 5:
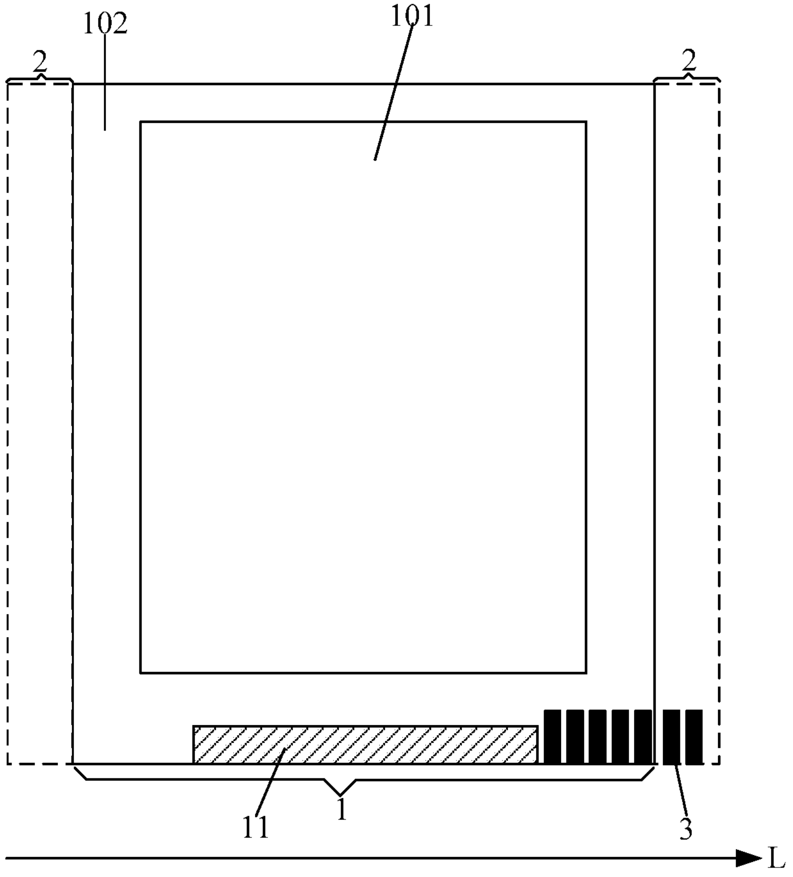
FIG. 5 is a top view of another structure of a display substrate according to an embodiment of the present disclosure.

Optionally, as shown in FIG. 5, the test electrodes 3 may be distributed at one side of the bonding end 11 along the direction L in which the body portion 1 and the to-be-cut portion 2 are arranged. With such an arrangement, for the display substrate with a small number of the test electrodes 3, regions (or space) of the body portion 1 and the to-be-cut portion 2, both of which are located at a same side of the bonding end 11, can fully satisfy the requirement on the layout of the test electrodes 3.

Optionally, the test electrodes 3 and the bonding end 11 are arranged in a straight line, an extension direction of which is along the direction L in which the body portion 1 and the to-be-cut portion 2 are arranged. The bonding end 11 is used for bonding with a peripheral circuit to provide a control signal and the like for the display substrate during display. With the arrangement, on one hand, the test electrodes 3 and the bonding end 11 do not occupy too much space on the display substrate, and the manufacturing processes for the test electrodes 3 and the bonding end 11 can be simplified; on the other hand, the test electrodes 3 and the bonding end 11 are arranged in a straight line, which can facilitate inputting test signals and control signals for display into the circuits in the display substrate, thus improving the test efficiency and the bonding efficiency.

Figure 6:
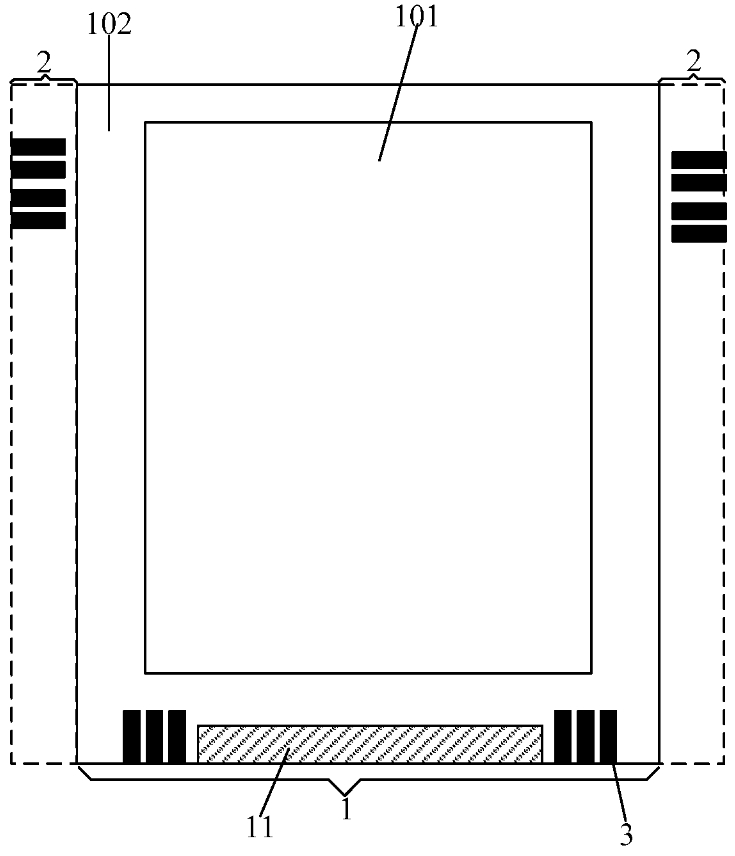
FIG. 6 is a top view of another structure of a display substrate according to an embodiment of the present disclosure.

Optionally, as shown in FIG. 6, the test electrodes 3 on the body portion 1 are distributed on one edge of the body portion 1 at one side of the display substrate and are arranged in a straight line; the test electrodes 3 on the to-be-cut portion 2 are distributed on one edge of the to-be-cut portion 2 at one side of the display substrate and are arranged in a straight line. With the arrangement, on one hand, the test electrodes 3 do not occupy too much space on the body portion 1 and the to-be-cut portion 2, and the manufacturing process for the test electrode 3 can be simplified; on the other hand, the test electrodes 3 are arranged in a straight line, which can facilitate inputting test signals to the circuits in the display substrate, thus improving the test efficiency. The test electrodes 3 are located on edges of the body portion 1 and the to-be-cut portion 2 at different sides. With the arrangement, the test electrodes 3 may be correspondingly provided at edges of the body portion 1 and the to-be-cut portion 2 at different sides according to the arrangement of the circuits inside the display substrate, thereby avoiding the mutual interference between the test signals due to the concentrated arrangement of the test electrodes 3 in the case of a large number of test electrodes 3, and improving the test quality.

Figure 7:
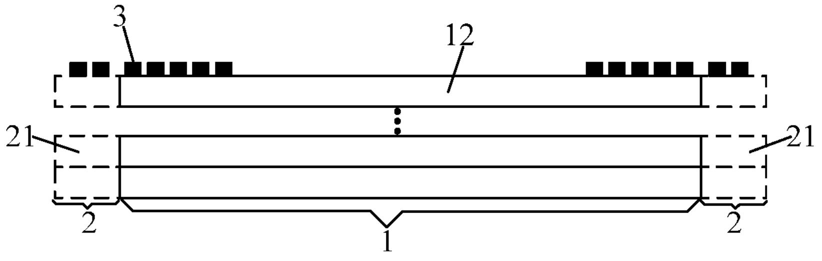
FIG. 7 is a cross-sectional view of a structure of the display substrate shown in FIG. 3 along line AA.

Optionally, in this embodiment, as shown in FIG. 7, the body portion 1 includes a plurality of first sub-layers 12 stacked in sequence, and the test electrodes 3 on the body portion 1 are distributed on a surface layer (the outermost sub-layer) of the body portion 1; the to-be-cut portion 2 includes a plurality of second sub-layers 21 stacked in sequence, and the test electrodes 3 on the to-be-cut portion 2 are distributed on a surface layer (the outermost sub-layer) of the to-be-cut portion 2.

Figure 8:
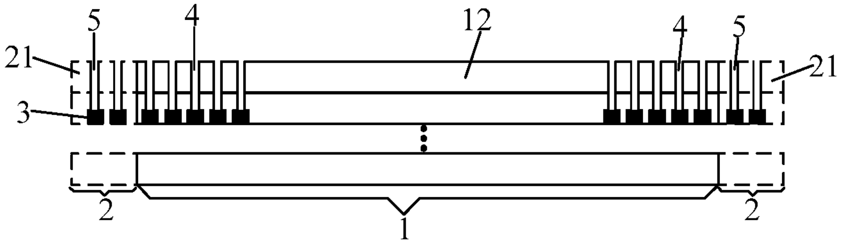
FIG. 8 is a cross-sectional view of another structure of the display substrate shown in FIG. 3 along line AA.

Optionally, as shown in FIG. 8, the test electrodes 3 on the body portion 1 are distributed on a first sub-layer 12 inside the body portion 1, and the test electrodes 3 are exposed through first vias 4 formed in at least one first sub-layer 12 covering on the test electrodes 3; the test electrodes 3 on the to-be-cut portion 2 are distributed on a second sub-layer 21 inside the to-be-cut portion 2, and the test electrodes 3 are exposed through second vias 5 formed in at least one second sub-layer 21 covering on the test electrodes 3. The test electrodes 3 arranged inside the body portion 1 and the to-be-cut portion 2 are respectively exposed through the first vias 4 and the second vias 5, so that when the signal test is performed on the display substrate, signals may be conveniently fed into the test electrodes 3 by press-fit pin or press-fit peripheral circuit board, thereby achieving the signal test on the display substrate.

The display substrate according to the embodiments of the present disclosure may be an LCD (liquid crystal display) substrate, an OLED (organic light emitting diode) display substrate, an LED (light emitting diode) display substrate, and the like.

Figure 9:
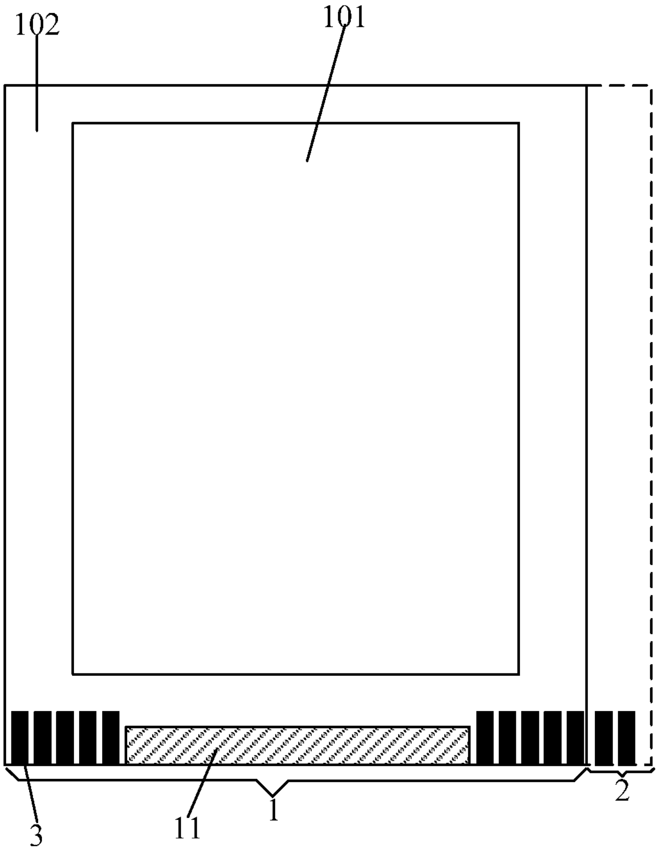
FIG. 9 is a top view of a structure of a display substrate according to another embodiment of the present disclosure.

The embodiments of the present disclosure further provide a display substrate, which is different from that in the above embodiments in that the to-be-cut portion 2 is disposed on one side of the body portion 1, as shown in FIG. 9.

Other structures of the display substrate in this embodiment are the same as those in the above embodiments, and are not described herein again.

In the display substrate according to the embodiment, some test electrodes are arranged on the body portion, and the other test electrodes are arranged on the to-be-cut portion, which, compared with the case in the related art that the test electrodes are arranged in the substrate region outside the display substrate or on the display substrate, can optimize the arrangement and layout of the test electrodes, reduce the requirement of the test electrodes on the arrangement space, and ensure that one mother board can be cut into a large number or a maximum number of display substrates, thereby alleviating or eliminating the adverse effect of the arrangement of the test electrodes on the cutting efficiency for the display substrates.

The embodiments of the present disclosure further provide a display panel, which includes the body portion in the display substrate in the above embodiments.

The to-be-cut portion of the display substrate in the above embodiments may be cut off by cutting, and the remaining body portion is processed through a subsequent assembly process to form the display panel in the present embodiment.

Based on the above structure of the display panel, the present embodiment further provides a method for manufacturing a display panel, including steps of: manufacturing the display substrate in the above embodiments; cutting the display substrate along a border line between the body portion and the to-be-cut portion, to cut off the to-be-cut portion; and performing an assembly process on the display substrate with the to-be-cut portion cut off.

By using the body portion in the display substrate in the above embodiments, the defective display substrate can be prevented from being put into the assembly process, so that the assembly material is saved, and the normal display of the display panel can be ensured.

The display panel according to the exemplary embodiments of the present disclosure may be any product or component having a display function, such as an LCD panel, an LCD television, an OLED panel, an OLED television, an LED panel, an LED television, a display, a mobile phone, a navigator, or the like.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display substrate, comprising a body portion and a to-be-cut portion on at least one side of the body portion, wherein the body portion and the to-be-cut portion are in a same plane and connected to have a one-piece structure;

the display substrate further comprises a plurality of test electrodes, some of the plurality of test electrodes are arranged on the body portion, and the others of the plurality of test electrodes are arranged on the to-be-cut portion;

the to-be-cut portion has a first end and a second end opposite to each other, the test electrodes arranged on the to-be-cut portion are closer to the first end than the second end, and the test electrodes arranged on the body portion are closer to the second end than the first end;

the test electrodes on the body portion are arranged in a straight line;

the body portion comprises a display region and a frame region around the display region; and the body portion comprises a bonding end in the frame region, and the bonding end and the test electrodes are on an edge of the body portion at a same side of the display substrate.

2. The display substrate of claim 1, wherein the to-be-cut portion is on one side of the body portion.

3. The display substrate of claim 1, wherein the to-be-cut portion comprises two portions on two opposite sides of the body portion.

4. The display substrate of claim 1, wherein the test electrodes are distributed at one side of the bonding end along a direction in which the body portion and the to-be-cut portion are arranged.

5. The display substrate of claim 1, wherein the test electrodes are distributed at two opposite sides of the bonding end along a direction in which the body portion and the to-be-cut portion are arranged.

6. The display substrate of claim 4, wherein the test electrodes and the bonding end are arranged in a straight line, an extension direction of which is along the direction in which the body portion and the to-be-cut portion are arranged.

7. The display substrate of claim 1, wherein the body portion comprises a plurality of first sub-layers stacked in sequence, and the test electrodes on the body portion are distributed on a surface layer of the body portion; or, the test electrodes on the body portion are distributed on one of the plurality of first sub-layers inside the body portion, and are exposed through first vias in at least one first sub-layer covering on the test electrodes; and the to-be-cut portion comprises a plurality of second sub-layers stacked in sequence, and the test electrodes on the to-be-cut portion are distributed on a surface layer of the to-be-cut portion; or, the test electrodes on the to-be-cut portion are distributed on one of the plurality of second sub-layers inside the to-be-cut portion, and are exposed through second vias in at least one second sub-layer covering on the test electrodes.

8. A display panel, comprising the body portion of the display substrate of claim 1.

9. A method for manufacturing a display panel, comprising steps of:

manufacturing the display substrate of claim 1;

cutting the display substrate along a border line between the body portion and the to-be-cut portion, to cut off the to-be-cut portion; and performing an assembly process on the display substrate with the to-be-cut portion cut off.

10. The display substrate of claim 5, wherein the test electrodes and the bonding end are arranged in a straight line, an extension direction of which is along the direction in which the body portion and the to-be-cut portion are arranged.

* * * * *